Oct. 24, 1961     A. B. GRANDOFF, JR     3,005,909
DISTRESS SIGNAL UNIT
Filed March 18, 1960     2 Sheets-Sheet 1
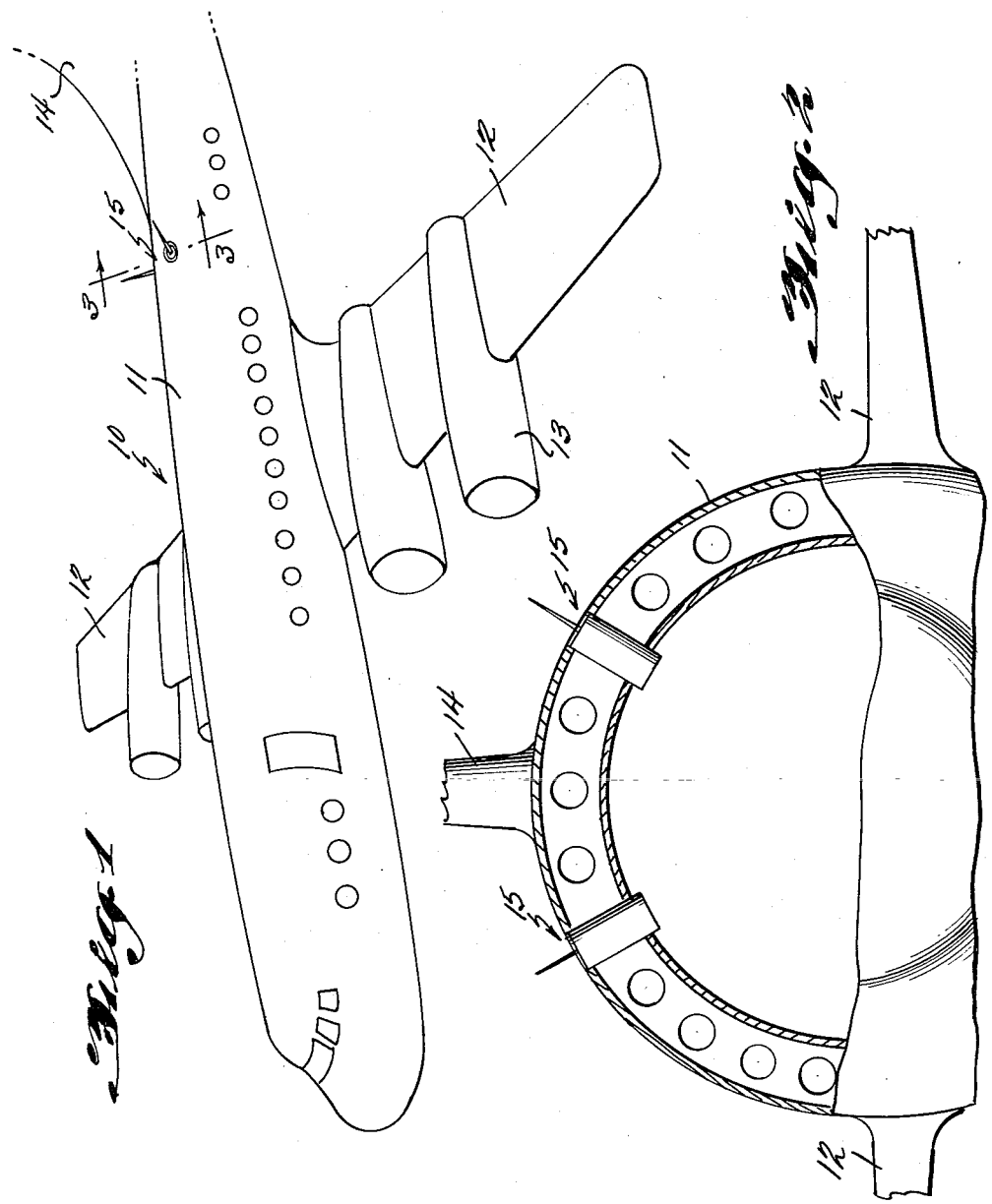
INVENTOR.
A. B GRANDOFF
BY
Kimmel & Crowell
ATTORNEYS

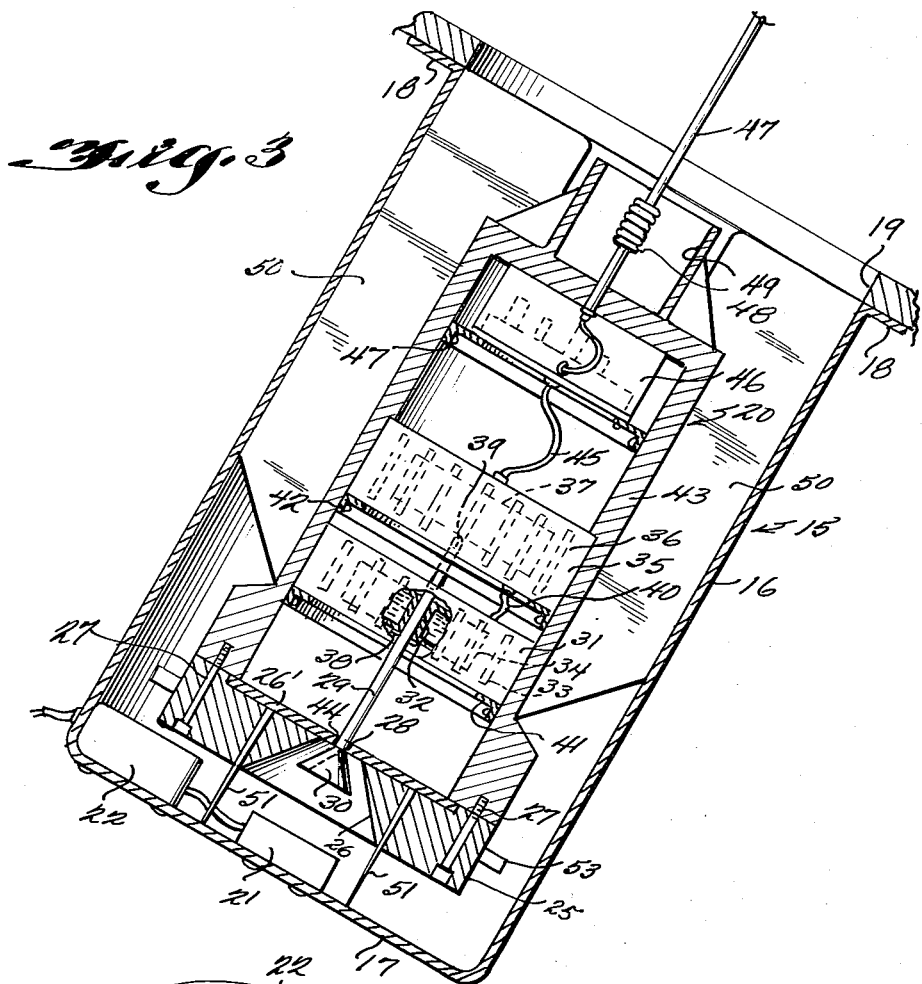
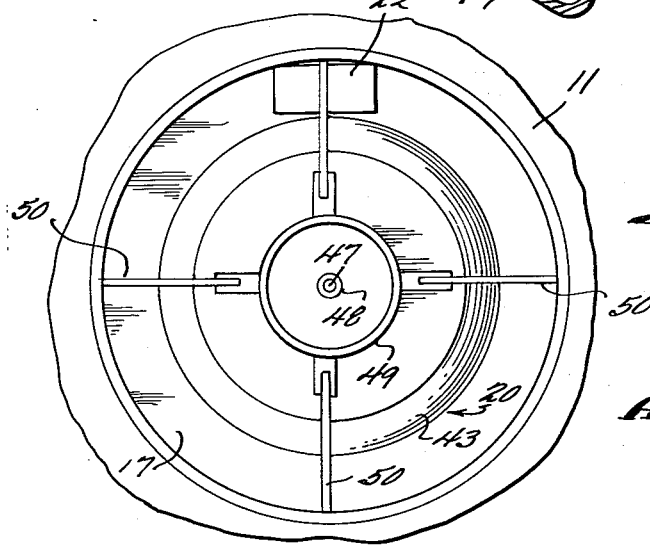

3,005,909
DISTRESS SIGNAL UNIT
Anthony B. Grandoff, Jr., 4619 Bay to Bay Blvd.,
Tampa, Fla.
Filed Mar. 18, 1960, Ser. No. 15,995
3 Claims. (Cl. 250—17)

This invention relates to a distress signal unit, and has particular application to an automatically jettisonable distress unit for aircraft.

A primary object of this invention is the provision of a distress signal unit which may be jettisoned from an aircraft for indicating the position at which the craft is down by means of a radio signal.

A further object of the invention is the provision of such a device which may be manually jettisoned by the pilot, or, in the absence of advance warning to the pilot, will jettison automatically upon a predetermined deceleration rate of the aircraft.

A further object of the invention is the provision of such a distress signal unit which is completely automatic in operation, and wherein the automatic or manual jettisoning of the unit will simultaneously energize a radio transmitter for the purpose of broadcasting a distress signal.

A further object of the invention is the provision of such a device which may be suitably attached to an aircraft in any desired location, and which is provided with flotation means insuring its upright flotation upon a fall into a body of water, and with guide vanes for directing the direction of fall, and provided with spikes or similar means which, in the event the device falls upon land, will hold it in upright or preferred transmitting position.

A further object of the invention is the provision of such a device which is sturdy and durable in construction, reliable and efficient in operation, and relatively simple and inexpensive to manufacture, install, and utilize.

Still other objects reside in the combinations of elements, arrangements of parts, and features of construction, all as will be more fully pointed out hereinafter, and disclosed in the accompanying drawings wherein there is shown a preferred embodiment of this inventive concept.

In the drawing:

FIGURE 1 is a partially schematic view of an aircraft, parts thereof being broken away, showing a suitable location for the distress signal unit of the instant invention.

FIGURE 2 is an enlarged front view of an aircraft, partially in elevation, partially in section, with parts being broken away showing the location of a pair of signal units on opposite sides of the aircraft fuselage, positioned in suitable receptacles or containers.

FIGURE 3 is an enlarged sectional view taken substantially along the line 3—3 of FIG. 1 as viewed in the direction indicated by the arrows showing the internal working mechanism of the unit, and FIGURE 4 is a top or front elevational view of the distress signal unit.

Similar reference characters refer to similar parts throughout the several views of the drawing.

Having reference now to the drawings in detail, and more particularly to FIGS. 1 and 2, there is generally indicated at 10 an aircraft of any conventional design, which includes a fuselage 11, wings 12, which are illustratively shown as carrying engine nacelles 13, and a conventional tail assembly 14, all of conventional design.

The distress signal unit of the instant invention is generally indicated at 15, and may be located in any suitable position on the aircraft body. A preferred location is as shown in FIGS. 1 and 2 to the rear of the wing, and forward to the tail assembly on opposite sides of the fuselage, as best shown in FIG. 2.

Having reference now particularly to FIG. 3, the device of the instant invention includes a barrel or cylindrical casing 16, which is provided with a bottom wall 17, and an upper flange 18, for securing the container about the margin of an opening 19 left in the skin of the fuselage, through which opening the distress signal unit generally indicated at 20 is adapted to be ejected. Means for ejecting the unit 20 are provided, and include an explosive charge 21, having an explosive force sufficient to eject the distress signal unit, but not sufficient to rupture the relatively heavy casing 16. The explosive charge 21 may be detonated manually in any desired conventional manner, as by a remote control switch in the pilot's cockpit, but means are also provided for automatically detonating the charge 21 upon the deceleration of the aircraft below a predetermined rate. Such a rate, for example, might be a deceleration of 20 miles per hour per second. A deceleration switch 22 of known design, provided with an impact hammer (not shown) is provided interiorly of the casing 16 for this purpose, and will, upon the achievement of the predetermined rate of deceleration automatically explode the charge 21.

The hollow distress unit 20 includes a relatively heavy base 25, having an enlarged funnel-shaped opening 26 therein to concentrate the force of the explosive charge for severing suitable frangible fastening members 27, which normally hold the distress signal unit in position in the receptacle 16. A plate 26' is secured to and closes the lower end of unit 20 and said slate has a central opening 28 therethrough, through which slidably extends a rod 29 which is provided at its lower end with a funnel-shaped member 30, which receives the first portion of the force of the explosion, and, upon the detonation of the charge 21, is impelled upwardly. The opening 28 in plate 26' is provided with a suitable gasket or seal 44 for insuring fluid imperviousness about rod 29. The rod 29 passes snugly through a first battery cell 31, through a central opening 32 therein, which battery cell contains the usual plates 33, and a frangible receptacle 34, which contains a suitable battery acid such, for example, as sulfuric acid. The upper extremity of the rod 29 extends into a second similar battery cell 35, which contains similar plates 36 and a similar acid containing frangible receptacle 37. A flange 38 surrounds rod 29 interiorly of cell 31, and the arrangement is such that upon the discharge of the explosive 21 the rod 29 is abruptly moved upwardly, so that the flange 38 ruptures the receptacle 34, and the point or tip 39 ruptures the receptacle 37, the arrangement being such that the escaping sulfuric acid upon coming in contact with the battery plates 33 and 36 creates an electrical current. The battery cells 31 and 35 are suitably connected in parallel by means of connections 40, and are suitably supported on plates or flanges 41 and 42, respectively, secured to the interior of a relatively heavy water-tight chamber or casing 43. Suitable wires 45 extend from the connected batteries to a radio transmitting unit 46, which is carried on a flange 47 interiorly of the casing 43, and which upon the application of current thereto automatically transmits a suitable predetermined distress signal, which may be readily located in a conventional manner by means of spaced directional antennae. The transmitter 46 is provided with an antenna 47, which is flexibly mounted as by means of a coil spring 48, the latter being shielded by a wall 49 surrounding the upper portion of the casing 43.

Guide vanes 50 are provided for maintaining the device in vertical position during free fall, so that upon contacting the water, if the aircraft is over water, the same will be maintained in an upright position, for floating, while transmitting signals. If the natural buoyancy of the device is insufficient to maintain it afloat, suitable cork belts or the like (not shown) may be added to insure buoyancy.

Spikes are provided on the underside of the device as indicated at 51, adapted to penetrate the ground, and hold the same in upright position if it happens to fall on land.

A lower ring 52 suitably secured to the casing 16 by means of ears or lugs 53 contains the funnel-shaped opening 26, and the frangible elements 27, the arrangement being such that the impact of the explosion against the base plate 25 separates the body 43 of the device and ejects the same.

From the foregoing it will now be seen that there is herein provided a device which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A distress signal for aircraft, comprising a casing adapted to be mounted in an aircraft fuselage, said casing having an end opening exteriorly of the fuselage, a signaling unit in said casing adapted to be projected from said casing, an explosive charge positioned in said casing, means for firing said charge upon deceleration of said plane at an abnormal rate, said unit including an elongated sealed chamber, a radio signal transmitter positioned in the upper portion of said chamber, upper and lower normally insert batteries connected in parallel, positioned in said chamber, each of said batteries including a battery casing, plates in said casing, the terminal plates of said battery being connected to said transmitter, a frangible acid containing receptacle positioned within each of said battery casings, and means for rupturing said acid containing receptacle coincident with detonation of said explosive charge, said last-mentioned means comprising a slidable rod extending through the bottom wall of said chamber and through said lower battery and terminating adjacent the lower surface of said frangible acid containing receptacle in said upper battery, a flange surrounding that portion of said rod immediately below said receptacle in said lower battery, a funnel-shaped member having its apex secured to the lower end of said rod and overlying said explosive charge, whereby upward movement of said rod will rupture said receptacle upon detonation of said explosive charge.

2. The apparatus of claim 1 including a heavy ring base fixed in said barrel and connected to the lower end of said chamber by frangible means, the opening of said ring being in the form of a truncated cone, and said funnel-shaped member being normally disposed within the confines of said ring.

3. A distress signal for aircraft comprising a casing adapted to be mounted in an aircraft fuselage, said casing having an end opening exteriorly of the fuselage and a closed opposite end, a heavy ring base member in said casing fixed in spaced relation to the closed end thereof, wall portions of said ring base member defining a centrally disposed generally truncated cone-shaped opening, a signaling unit secured to said ring base member by frangible means, an explosive charge positioned in said casing between the closed end thereof and the central opening of the ring shaped members, means to fire said charge upon abnormal deceleration of the aircraft, the force of the exploding charge passing through the opening in the ring base member causing said signaling unit to break said frangible means and be expelled from said casing.

References Cited in the file of this patent
UNITED STATES PATENTS

| | | |
|---|---|---|
| 2,473,050 | Camp | June 14, 1949 |
| 2,552,969 | Holman | May 15, 1951 |
| 2,587,564 | Williams | Feb. 26, 1952 |
| 2,628,307 | Lloyd et al. | Feb. 10, 1953 |
| 2,825,803 | Newbrough | Mar. 4, 1958 |
| 2,831,965 | Bayze | Apr. 22, 1958 |
| 2,831,967 | Bayze | Apr. 22, 1958 |
| 2,852,592 | Salanze | Sept. 16, 1958 |
| 2,928,935 | Murray | Mar. 15, 1960 |
| 2,935,547 | Kordesch | May 3, 1960 |
| 2,959,671 | Stevinson | Nov. 8, 1960 |
| 2,978,608 | Sirons | Apr. 11, 1961 |

FOREIGN PATENTS

| | | |
|---|---|---|
| 55,289 | Norway | June 11, 1955 |